United States Patent
Yoshida

(10) Patent No.: US 9,806,582 B2
(45) Date of Patent: Oct. 31, 2017

(54) MOTOR

(71) Applicant: Mabuchi Motor Co., Ltd., Matsudo, Chiba (JP)

(72) Inventor: Atsushi Yoshida, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 75 days.

(21) Appl. No.: 15/012,634

(22) Filed: Feb. 1, 2016

(65) Prior Publication Data

US 2016/0149465 A1    May 26, 2016

Related U.S. Application Data

(63) Continuation of application No. PCT/JP2014/079349, filed on Nov. 5, 2014.

(30) Foreign Application Priority Data

Nov. 21, 2013    (JP) .................................. 2013-241329

(51) Int. Cl.
*H02K 5/24*    (2006.01)
*H02K 11/02*    (2016.01)
(Continued)

(52) U.S. Cl.
CPC ................. *H02K 5/24* (2013.01); *H02K 3/28* (2013.01); *H02K 5/04* (2013.01); *H02K 11/0094* (2013.01); *H02K 11/02* (2013.01); *H02K 11/215* (2016.01)

(58) Field of Classification Search
CPC ........ H02K 5/24; H02K 29/08; H02K 11/026; H02K 11/215; H02K 5/225; H02K 2211/03; H02K 11/0094; H02K 11/21
(Continued)

(56) References Cited

U.S. PATENT DOCUMENTS

| 2004/0061391 A1* | 4/2004 | Matsuyama | ............ G01P 1/026 |
| | | | 310/71 |
| 2005/0184606 A1* | 8/2005 | Kokubu | ................. H02K 5/148 |
| | | | 310/75 R |

(Continued)

FOREIGN PATENT DOCUMENTS

| JP | 2002165413 A | 6/2002 |
| JP | 2007159385 A | 6/2007 |

(Continued)

OTHER PUBLICATIONS

PCT Application No. PCT/JP2014/079349 International Preliminary Report on Patentability dated May 24, 2016, 10 pages including English translation.

(Continued)

*Primary Examiner* — Thanh Lam
(74) *Attorney, Agent, or Firm* — Schwabe Williamson & Wyatt, PC

(57) ABSTRACT

A motor includes: an end bell mounted on an opening of a cylindrical rotor housing for housing a rotor and is provided with a power-feeding path to the rotor; and a choke coil connected in the middle of the power-feeding path. The choke coil overlaps at least a part of the rotor housing as viewed from outside the rotor housing in a radial direction and as viewed in a direction perpendicular to an axial direction, and is arranged such that a longitudinal direction thereof extends along a direction parallel to a rotating shaft of the motor.

4 Claims, 4 Drawing Sheets

(51) Int. Cl.
*H02K 3/28* (2006.01)
*H02K 5/04* (2006.01)
*H02K 11/00* (2016.01)
*H02K 11/215* (2016.01)

(58) Field of Classification Search
USPC .................................. 310/51, 71, 68 R, 68 B
See application file for complete search history.

(56) References Cited

U.S. PATENT DOCUMENTS

| | | | |
|---|---|---|---|
| 2007/0103013 A1 | 5/2007 | Sakohira | |
| 2010/0283339 A1* | 11/2010 | Kitai | H02K 11/215 310/71 |
| 2012/0313467 A1* | 12/2012 | Omae | B62D 5/0406 310/71 |
| 2013/0285492 A1* | 10/2013 | Ozaki | H02K 11/0084 310/71 |
| 2013/0300222 A1* | 11/2013 | Nakano | H02K 11/0084 310/43 |
| 2014/0132095 A1* | 5/2014 | Aoki | H02K 7/116 310/71 |
| 2015/0236570 A1* | 8/2015 | Hayashi | H02K 11/0073 310/45 |

FOREIGN PATENT DOCUMENTS

| | | |
|---|---|---|
| JP | 2008035629 A | 2/2008 |
| JP | 2009-268207 A | 11/2009 |
| JP | 2010084669 A | 4/2010 |
| JP | 2010-136590 A | 6/2010 |

OTHER PUBLICATIONS

PCT Application No. PCT/JP2014/079349 International Search Report dated Jan. 14, 2015, 2 pages.
First Office Action in Chinese Application No. 2014800412226 dated Apr. 21, 2017; 11 pages including English translation.

* cited by examiner

MOTOR

This application is based upon and claims the benefit of priority from the prior Japanese Patent Application No. 2013-241329, filed on Nov. 21, 2013, and International Patent Application No. PCT/JP 2014/079349, filed on Nov. 5, 2014, the entire content of each of which is incorporated herein by reference.

BACKGROUND OF THE INVENTION

1. Field of the Invention

The present invention relates to a motor.

2. Description of the Related Art

In the conventional practice, motors are used as driving sources of various types of apparatuses and products. Associated with advances in wireless technology and widespread use thereof, the need to reduce electric noise generated by motors is increased. In one approach to reduce electric noise, an electric noise reduction element such as a capacitor, coil, or varistor is mounted in the motor.

For example, there is known a DC motor in which a circuit to reduce electromagnetic noise generated between the brush and the commutator of the DC motor is provided in the housing (see patent document 1). The DC motor is configured such that a noise prevention element such as a choke coil is housed in the brush holder. Further, the choke is arranged such that the longitudinal direction thereof is parallel to the rotating shaft of the motor.

RELATED ART DOCUMENT

[patent document 1] JP2002-165413

The higher the inductance of a choke coil, the higher the effect of the coil to reduce electric noise. Further, the larger the outer diameter of the core and the coil and the larger the number of turns of the coil and the higher the magnetic permeability of the core material, the higher the inductance. If the number of turns of the coil is increased in order to increase the inductance and maintain the performance of the motor at the same time, the overall length of the coil is increased. This increases the size of the housing for housing the choke coil.

SUMMARY OF THE INVENTION

The present invention addresses the issue and a purpose thereof is to provide a technology for producing a motor capable of realizing electric noise efficiently in a reduced space.

The motor according to an embodiment of the present invention includes: an end bell mounted on an opening of a cylindrical rotor housing for housing a rotor and is provided with a power-feeding path to the rotor; and a noise prevention element connected in the middle of the power-feeding path. The noise prevention element overlaps at least a part of the rotor housing as viewed from outside the rotor housing in a radial direction and as viewed in a direction perpendicular to an axial direction, and is arranged such that a longitudinal direction thereof extends along a direction parallel to a rotating shaft of the motor.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
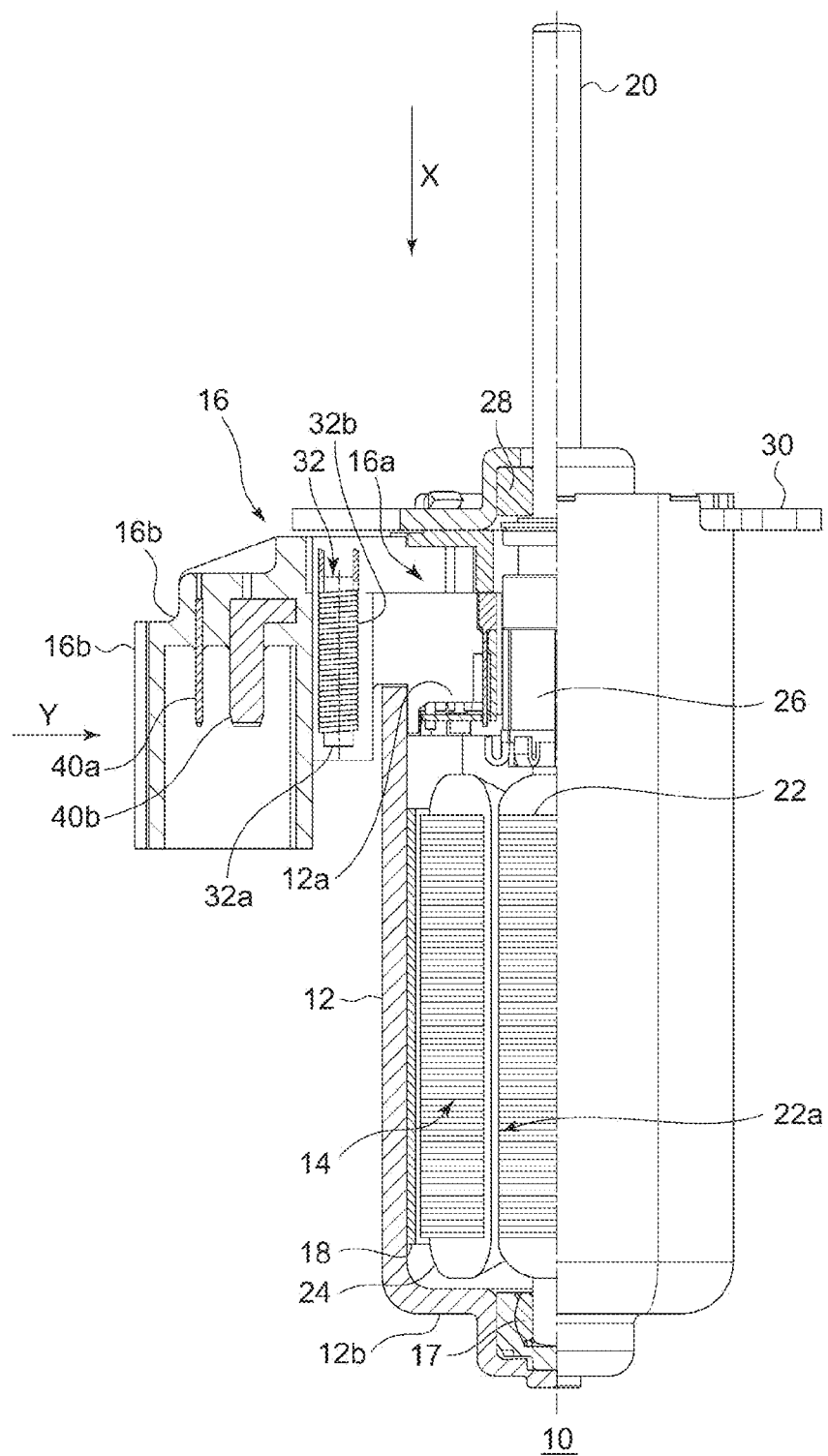
FIG. 1 is a half sectional view of a motor according to an embodiment of the present invention.

The invention will now be described by reference to the preferred embodiments. This does not intend to limit the scope of the present invention, but to exemplify the invention.

The motor according to an embodiment of the present invention includes: an end bell mounted on an opening of a cylindrical rotor housing for housing a rotor and is provided with a power-feeding path to the rotor; and a noise prevention element connected in the middle of the power-feeding path. The noise prevention element overlaps at least a part of the rotor housing as viewed from outside the rotor housing in a radial direction and as viewed in a direction perpendicular to an axial direction, and is arranged such that a longitudinal direction thereof extends along a direction parallel to a rotating shaft of the motor.

According to the embodiment, the noise prevention element is not provided inside the cylindrical rotor housing but is provided, as viewed in the axial direction of the motor, outside the rotor housing. As a result, the flexibility of designing the shape and size of the noise prevention element is increased and the noise prevention element capable of reducing electric noise highly efficiently can be provided, while reducing the overall size of the motor from being at the same time.

This allows the overall length of the noise prevention element to be extended to provide higher noise reduction effect without extending the overall length of the motor.

The end bell may include: a lid conforming to a shape of an opening of the rotor housing; and a connector provided at a position projecting radially from an outer edge of the lid and connected to a power-feeding terminal fed with an electric current from an external power supply. The noise prevention element may be provided between the lid and the connector.

The rotor housing may be a magnetic body. This allows the rotor housing to function as a magnetic shield and reduces magnetic saturation of the noise prevention element due to the magnet.

The motor may further include: a first circuit substrate used for a rotation detector for detecting rotation of the rotor; and a second circuit substrate separate from the first circuit substrate and used for the noise prevention element. The first circuit substrate is provided near a center of the lid, and the second circuit substrate is provided near the connector. This allows the rotation detector and the noise prevention element to be arranged at a distance so that propagation of electric noise due to cross-talk is reduced. The noise prevention element is exemplified by a choke coil. The rotation detector is exemplified by a Hall element.

According to the embodiment, the size of the motor is reduced and noise is reduced at the same.

A description will be given of embodiments of the present invention with reference to the drawings. Like numerals represent like elements so that the description will be omitted accordingly. The structures described hereinbelow are only exemplary and does not limit the scope of the present invention.

First Embodiment

FIG. 1 is a half sectional view of a motor according to an embodiment of the present invention. The motor 10 shown in FIG. 1 mainly includes a rotor housing 12, a rotor 14, and an end bell 16. The rotor housing 12 is formed with an opening 12a at one end thereof and a closed bottom 12b at the other end. The bottom 12b is formed with a recess and a bearing 17 is housed in the recess. An arc-shaped magnet 18 is provided on the inner wall of the rotor housing 12.

The rotor 14 includes a shaft 20, a core 22, a winding 24, and a commutator 26. The shaft 20 is a rotating shaft for supporting the rotor 14 via the bearing 17 and a bearing 28. The shaft 20 also functions as an output shaft. The bearing 28 is housed in a recess formed at the center of an end plate 30. The core 22 includes a laminate of a plurality of steel plates. The shaft 20 runs through the core 22 and is fixed at the center of the core 22. The winding 24 is wound around a groove 22a of the core 22 and generates a magnetic force by conducting an electric current.

Like the core 22, the commutator 26 is fixed to the shaft 20. The commutator 26 is a contact that induces in the winding 24 an electric current conducted via a contact brush (not shown) according to a timing schedule. For example, the brush is a fork-shaped metal brush containing precious metal as a main component. Alternatively, the brush may be a carbon brush.

The end bell 16 is mounted to the opening 12a of the cylindrical rotor housing 12 for housing the rotor 14. A power-feeding path to the rotor 14 described later is provided in the end bell 16. A choke coil 32 as a noise prevention element is formed in the middle of the power-feeding path.

The end bell 16 includes a circular lid 16a conforming to the shape of the opening 12a of the rotor housing 12, and a connector 16b provided at a position projecting radially from the outer edge of the lid 16a and connected to a power-feeding terminal fed with an electric current from an external power supply. Terminals 40a and 40b are provided inside the connector 16b.

The choke coil 32 is provided in a region between the lid 16a and the connector 16b. This means that the choke coil 32 is not provided, as viewed in the axial direction X of the motor, inside the opening 12a of the cylindrical rotor housing 12 but is provided outside the rotor housing 12, i.e., at a position not aligned with the rotor housing 12. As a result, the flexibility of designing the shape and size of the choke coil 32 is increased and the choke coil 32 capable of reducing electric noise highly efficiently can be provided, while reducing the overall size of the motor 10 at the same time.

The choke coil 32 is mounted toward the rotor housing in the end bell 16. The choke coil 32 overlaps at least a part of the rotor housing 12 as viewed in the direction Y perpendicular to the axial direction X. This allows the overall length of the choke coil 32 to be extended to provide higher noise reduction effect without extending the overall length of the motor 10.

The choke coil 32 includes a ferrite core 32a and a coil 32b wound around the outer circumference of the ferrite core 32a. The choke coil 32 is provided such that the longitudinal direction thereof extends along a direction parallel to the rotating shaft (shaft 20) of the motor 10.

The rotor housing 12 is formed of a magnetic material. This allows the rotor housing 12 to function as a magnetic shield and reduces magnetic saturation of the choke coil 32 due to the magnet 18.

As described above, the motor 10 according to the first embodiment is configured such that the choke coil 32 is provided outside the rotor housing 12 so that the flexibility of designing the choke coil 32 is increased. Therefore, the choke coil itself can be extended as compared with the case of related-art motors where the overall length of the choke coil that can be mounted is limited by the overall length of the motor. In other words, the number of turns in the motor 10 can be increased without reducing the thickness of the choke coil 32. Therefore, the inductance of the coil is increased and the effect of reducing electric noise can be improved.

Further, because the choke coil 32 is ensured to overlap at least a part of the rotor housing 12 as viewed in the direction Y perpendicular to the axial direction X of the motor 10, the overall length of the motor 10 need not be extended even if the choke coil 32 is extended. Thus, the motor 10 meets the requirements for compact motor size and electric noise reduction at the same time.

If the choke coil is provided above the opening of the rotor housing as in related-art motors, no magnetic shield is provided between the magnet and the choke coil so that magnetic saturation may occur in the choke coil due to the magnet. In the motor 10 according to the first embodiment, however, the rotor housing 12 is located between the choke coil 32 and the magnet 18 since the choke coil 32 is ensured to overlap the rotor housing 12 as viewed in the direction Y perpendicular to the axial direction X of the motor. This allows the rotor housing 12 to shield much of the magnetic flux directed from the magnet 18 toward the choke coil 32 so that the likelihood of magnetic saturation in the choke coil 32 due to the magnet 18 is reduced more successfully.

Figure 2A:
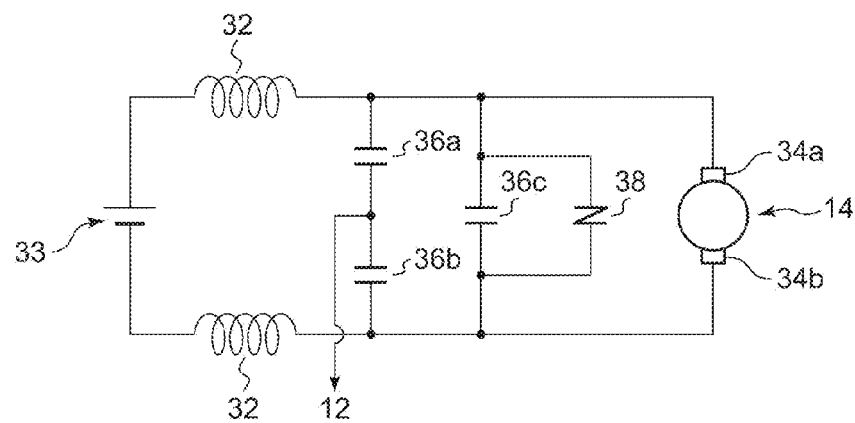
FIG. 2A is a circuit diagram showing an exemplary power-feeding path according to the first embodiment.
Figure 2B:
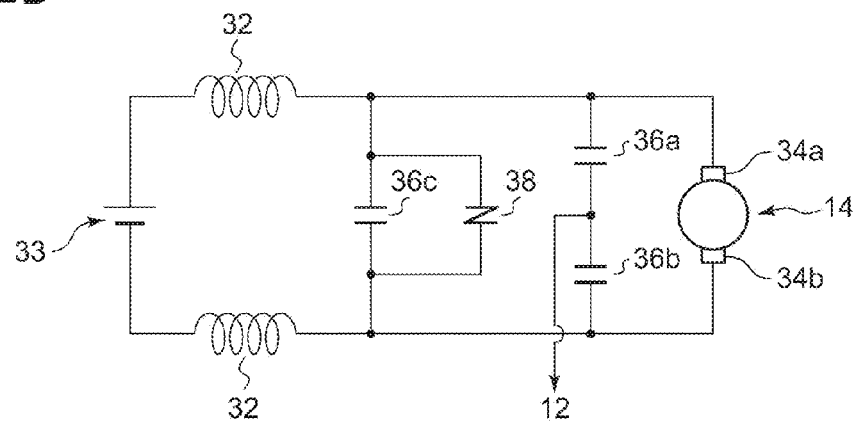
FIG. 2B is a circuit diagram showing another exemplary power-feeding path according to the embodiment.

FIG. 2A is a circuit diagram showing an exemplary power-feeding path according to the embodiment, and FIG. 2B is a circuit diagram showing another exemplary power-feeding path according to the embodiment. As shown in FIGS. 2A and 2B, the choke coil 32 is connected between an external power supply 33 and brushes 34a and 34b for feeding power to the rotor 14. Further, capacitors 36a, 36b, and 36c for reducing electric noise and a varistor 38 for protecting the other electronic components from a high voltage are connected in the circuit.

Second Embodiment

Figure 3:
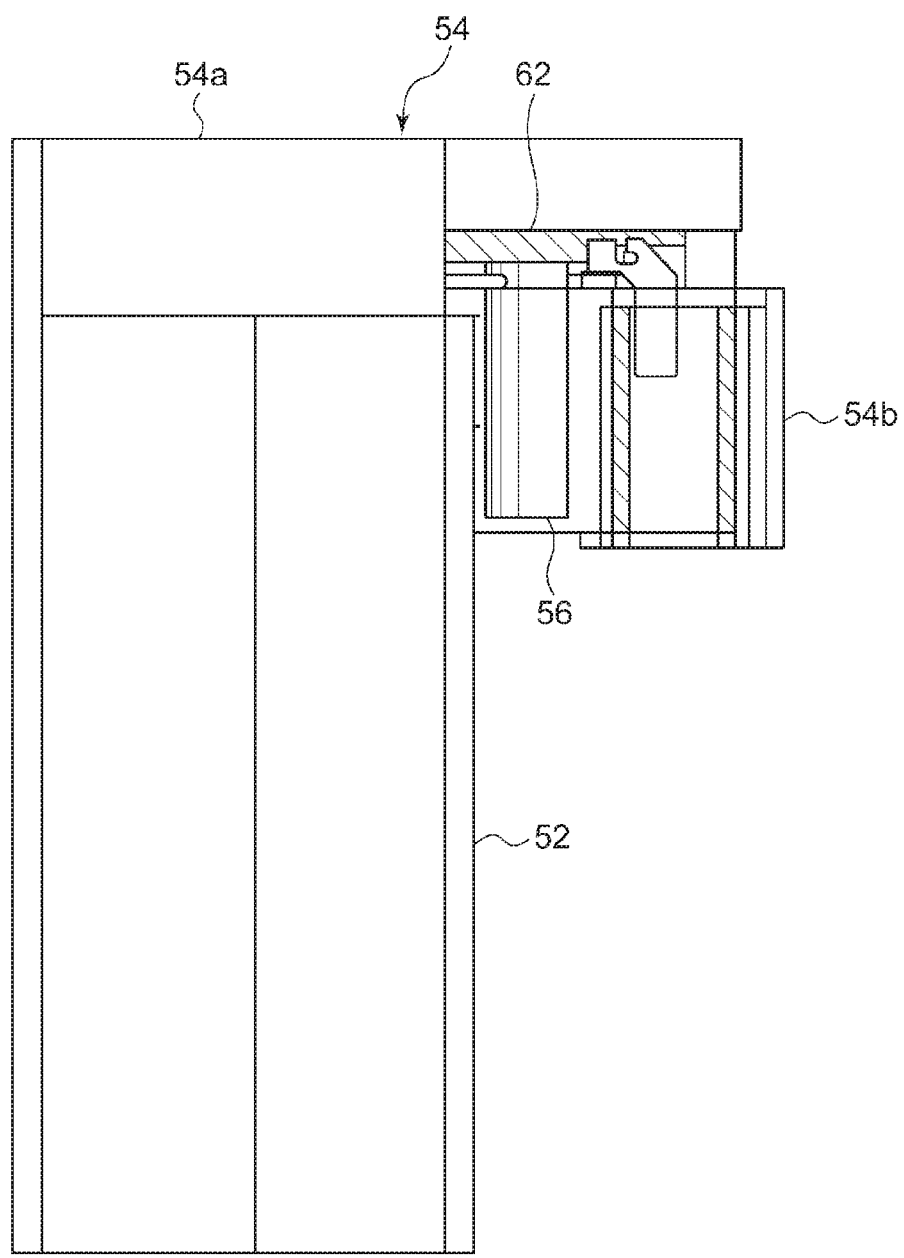
FIG. 3 is a schematic diagram showing the motor according to the second embodiment.
Figure 4A:
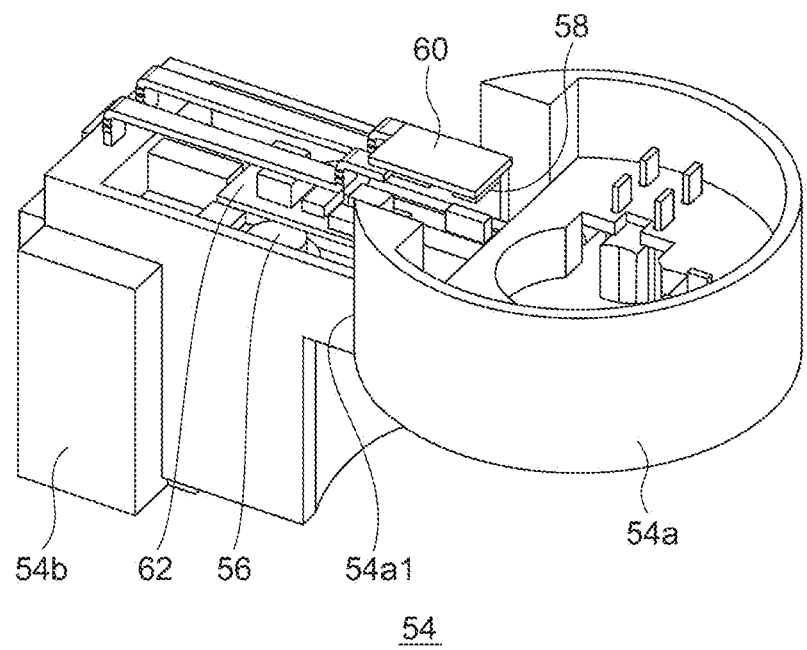
FIGS. 4A and 4B are perspective views of the end bell provided in the motor according to the second embodiment.
Figure 4B:
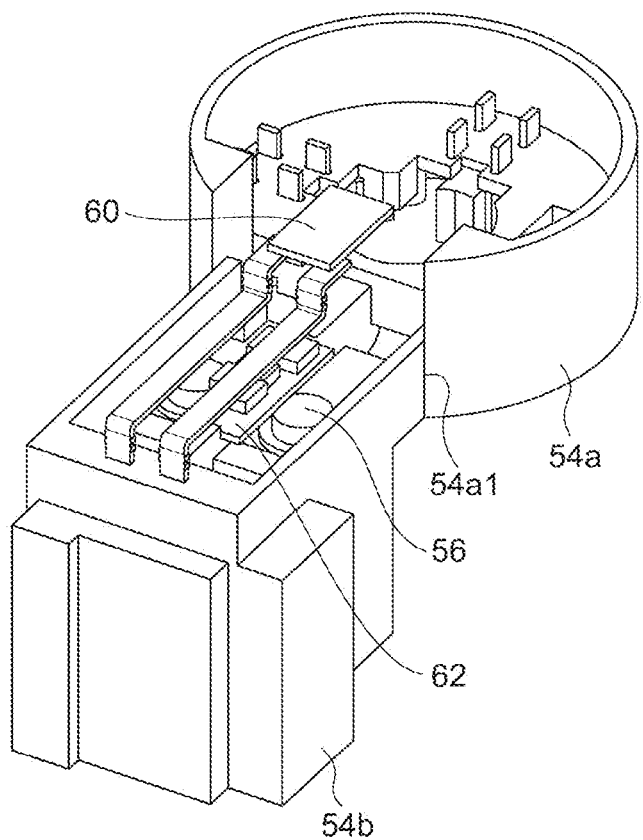

FIG. 3 schematically shows the motor according to a second embodiment. FIGS. 4A and 4B are perspective views of the end bell provided in the motor according to the second embodiment.

As shown in FIG. 3, a motor 50 according to the second embodiment includes a rotor housing 52 and an end bell 54. The end bell 54 includes a circular lid 54a conforming to the shape of the opening of the rotor housing 52, and a connector 54b provided at a position projecting radially from an outer edge 54a1 of the lid 54a and connected to a power-feeding terminal fed with an electric current from an external power supply. A choke coil 56 is provided between the lid 54a and the connector 54b.

The motor 50 further includes a first circuit substrate 60 used for a Hall element 58 for detecting the rotation of the rotor and a second circuit substrate 62 separate from the first circuit substrate 60 and used for a choke coil 56, the Hall element 58 being mounted on the first circuit substrate 60, and the choke coil 56 being mounted on the second circuit substrate. The first circuit substrate 60 is provided in the vicinity of the lid 54*a* and the second circuit substrate 62 is provided in the vicinity of the connector 54*b*.

If a Hall element and a choke coil are mounted on a single circuit substrate as in related-art motors, the Hall element and the choke coil approximate each other so that cross-talk may be induced, imposing constraints on the layout of the elements. Noise caused by cross-talk may lower the precision of detection by the Hall element.

By using circuit substrates such that one is used for the choke coil and other for the Hall element in the motor 50 according to the second embodiment, the Hall element 58 and the choke coil 56 are arranged at a distance so that propagation of electric noise due to cross-talk is reduced. Accordingly the impact of noise on the detection signal and the output signal of the Hall element is mitigated so that the precision of detection by the Hall element is improved.

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention.

The invention claimed is:

1. A motor comprising:
   an end bell mounted on an opening of a cylindrical rotor housing for housing a rotor and is provided with a power-feeding path to the rotor;
   a noise prevention element connected in the middle of the power-feeding path;
   a first circuit substrate used for a rotation detector for detecting rotation of the rotor; and
   a second circuit substrate separate from the first circuit substrate and used for the noise prevention element, wherein
   the noise prevention element overlaps at least a part of the rotor housing as viewed from outside the rotor housing in a radial direction and as viewed in a direction perpendicular to an axial direction, and is arranged such that a longitudinal direction thereof extends along a direction parallel to a rotating shaft of the motor,
   the first circuit substrate is provided inside the rotor housing in the radial direction, and
   the second circuit substrate is provided outside the rotor housing in the radial direction.

2. The motor according to claim 1, wherein
   the end bell comprises:
   a lid conforming to a shape of an opening of the rotor housing; and
   a connector provided at a position projecting radially from an outer edge of the lid and connected to a power-feeding terminal fed with an electric current from an external power supply, wherein
   the noise prevention element is provided between the lid and the connector.

3. The motor according to claim 1, wherein
   the rotor housing is a magnetic body.

4. The motor according to claim 1, wherein
   the noise prevention element is a choke coil.

* * * * *